(12) United States Patent
Lanza

(10) Patent No.: US 8,869,470 B2
(45) Date of Patent: Oct. 28, 2014

(54) PROTECTIVE COVERING FOR ROOF DEVICE

(71) Applicant: Carlo John Lanza, Islip, NY (US)

(72) Inventor: Carlo John Lanza, Islip, NY (US)

( * ) Notice: Subject to any disclaimer, the term of this patent is extended or adjusted under 35 U.S.C. 154(b) by 3 days.

(21) Appl. No.: 13/673,537

(22) Filed: Nov. 9, 2012

(65) Prior Publication Data

US 2013/0174496 A1 Jul. 11, 2013

Related U.S. Application Data

(63) Continuation-in-part of application No. 12/661,379, filed on Mar. 16, 2010, now Pat. No. 8,316,592.

(60) Provisional application No. 61/210,639, filed on Mar. 21, 2009.

(51) Int. Cl.
*E04D 1/36* (2006.01)
*E04D 13/18* (2014.01)

(52) U.S. Cl.
USPC .................................. 52/173.3; 52/58; 285/42

(58) Field of Classification Search
USPC .................. 52/173.3, 219, 58, 60; 285/42
See application file for complete search history.

(56) References Cited

U.S. PATENT DOCUMENTS

| | | | |
|---|---|---|---|
| 853,897 | A | 5/1907 | Porter |
| 917,167 | A | 4/1909 | Shaw |
| 2,129,833 | A | 9/1938 | Fradette |
| 2,300,842 | A | 11/1942 | Leslie |
| 2,490,220 | A | 12/1949 | Leslie |
| 2,551,223 | A | 5/1951 | Schneider |
| 2,692,548 | A | 10/1954 | Knorr |
| 3,579,930 | A | 5/1971 | Murphy |
| 3,673,748 | A | 7/1972 | Minialoff |
| 3,690,079 | A | 9/1972 | Hemminger |
| 3,895,467 | A | 7/1975 | Clement |
| 4,058,111 | A | 11/1977 | Wendel |
| 4,102,090 | A | 7/1978 | Anguish |
| 4,269,173 | A | 5/1981 | Krueger et al. |
| 4,278,070 | A | 7/1981 | Bowen |

(Continued)

FOREIGN PATENT DOCUMENTS

| | | | |
|---|---|---|---|
| EP | 95455 A2 | | 11/1983 |
| GB | 2197359 A | * | 5/1988 |
| GB | 2215359 A | | 9/1989 |

OTHER PUBLICATIONS

Fain, Steve et al, Pitched Roof Racking, Oct./Nov. 2008, pp. 72-76, 78 & 80, solarproffesionals.com.

*Primary Examiner* — Elizabeth A Plummer
(74) *Attorney, Agent, or Firm* — Alfred M. Walker

(57) ABSTRACT

A protective covering helps to prevent fastener leaks from roof installed fasteners, which are used to mount roofing systems, such as a solar panel installation system, to roofs with a mounting bracket attached to the roof. The protective covering is a portion of flat, malleable waterproof material molded to form a cover, forming a rounded or peaked triangular-shaped structure when viewed from the side. The triangular shaped structure includes a base and a hypotenuse portion where the line of the roof acts as a side which is covered by at least the hypotenuse portion. The hypotenuse portion meets the roof at an angle. The covering is adapted for insertion under portions of a roof shingle, and extends back in a slight rise (downwardly with respect to the root) to cover the fastener and L-shaped bracket, which the fastener fastens to the roof.

12 Claims, 12 Drawing Sheets

(56) References Cited

U.S. PATENT DOCUMENTS

| | | | |
|---|---|---|---|
| 4,291,684 A | 9/1981 | Werner et al. | |
| 4,296,740 A | 10/1981 | Meckler | |
| 4,372,292 A | 2/1983 | Ort | |
| 4,677,248 A | 6/1987 | Lacey | |
| 4,825,608 A * | 5/1989 | Makin | 52/200 |
| 4,897,974 A * | 2/1990 | Lane | 52/199 |
| 5,027,576 A | 7/1991 | Gustavsson | |
| 5,123,208 A | 6/1992 | Kirby et al. | |
| 5,164,020 A | 11/1992 | Wagner | |
| 5,328,212 A * | 7/1994 | Kosik et al. | 285/42 |
| 5,590,495 A | 1/1997 | Bressler | |
| 5,630,752 A | 5/1997 | Gubash | |
| 5,664,955 A * | 9/1997 | Arnett | 439/135 |
| 5,743,063 A | 4/1998 | Boozer | |
| 5,953,869 A | 9/1999 | Balfour et al. | |
| 6,052,956 A | 4/2000 | Hoy et al. | |
| 6,570,084 B2 | 5/2003 | Dinwoodie | |
| 6,733,381 B1 | 5/2004 | Ploeger | |
| 6,786,012 B2 | 9/2004 | Bradley | |
| 6,959,517 B2 | 11/2005 | Poddany et al. | |
| 7,260,918 B2 | 8/2007 | Liebendorfer | |
| D593,842 S * | 6/2009 | Corbin | D8/353 |
| 7,730,681 B2 * | 6/2010 | Gilleran | 52/220.8 |
| 7,857,269 B2 | 12/2010 | Plaisted et al. | |
| 7,921,607 B2 | 4/2011 | Thompson et al. | |
| 7,946,082 B2 | 5/2011 | Ohkoshi et al. | |
| 8,177,180 B2 | 5/2012 | Plaisted et al. | |
| D678,996 S * | 3/2013 | Jones | D23/393 |
| 8,448,407 B1 * | 5/2013 | Wiener | 52/745.21 |
| 8,713,858 B1 * | 5/2014 | Xie | 52/58 |
| 2002/0046506 A1 | 4/2002 | Ullman | |
| 2002/0092246 A1 | 7/2002 | Graham | |
| 2004/0140002 A1 | 7/2004 | Brown et al. | |
| 2005/0115162 A1 | 6/2005 | Nee | |
| 2006/0156648 A1 | 7/2006 | Thompson et al. | |
| 2006/0266405 A1 | 11/2006 | Lenox | |
| 2007/0251567 A1 | 11/2007 | Plaisted | |
| 2008/0000173 A1 | 1/2008 | Lenox et al. | |
| 2008/0190047 A1 | 8/2008 | Allen | |
| 2009/0019796 A1 | 1/2009 | Liebendorfer | |
| 2009/0114269 A1 | 5/2009 | Fletcher et al. | |
| 2009/0320898 A1 | 12/2009 | Gumm | |
| 2011/0067327 A1 | 3/2011 | Eiffert et al. | |
| 2011/0173900 A1 * | 7/2011 | Plaisted et al. | 52/97 |
| 2011/0174360 A1 | 7/2011 | Plaisted et al. | |
| 2011/0203637 A1 * | 8/2011 | Patton et al. | 136/244 |
| 2011/0232222 A1 * | 9/2011 | McPheeters et al. | 52/698 |
| 2011/0314751 A1 * | 12/2011 | Jette | 52/173.3 |
| 2011/0314753 A1 * | 12/2011 | Farmer et al. | 52/173.3 |
| 2012/0023843 A1 | 2/2012 | Stearns et al. | |
| 2012/0031019 A1 * | 2/2012 | Stearns et al. | 52/173.3 |

* cited by examiner

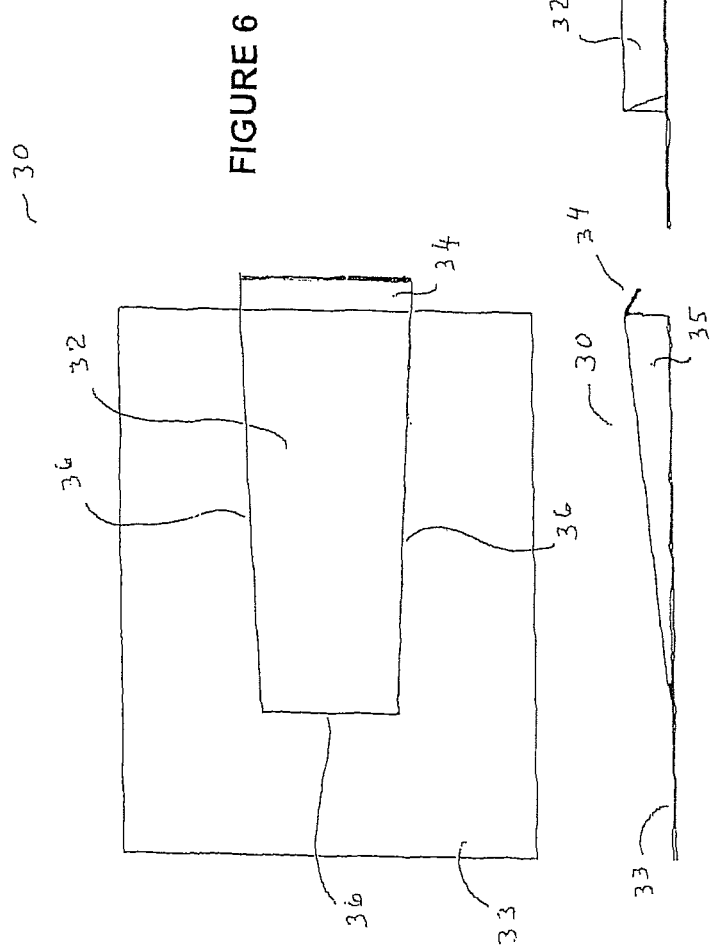
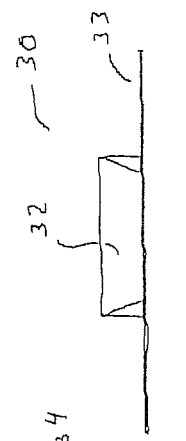

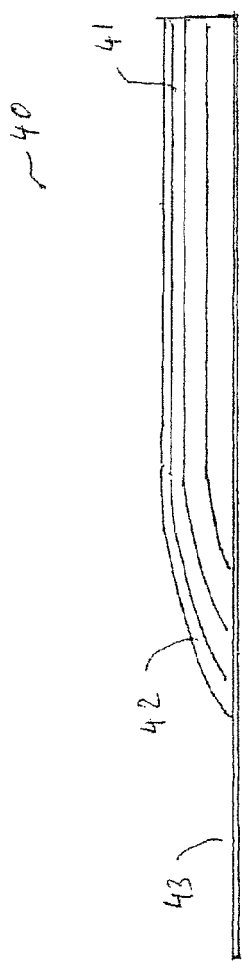
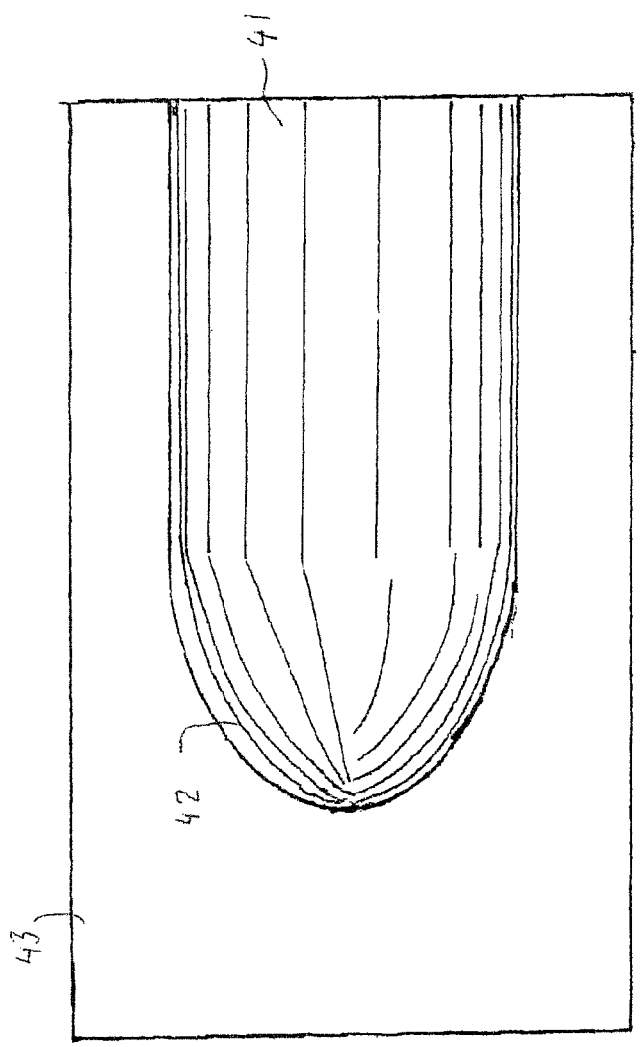
FIGURE 10
FIGURE 11

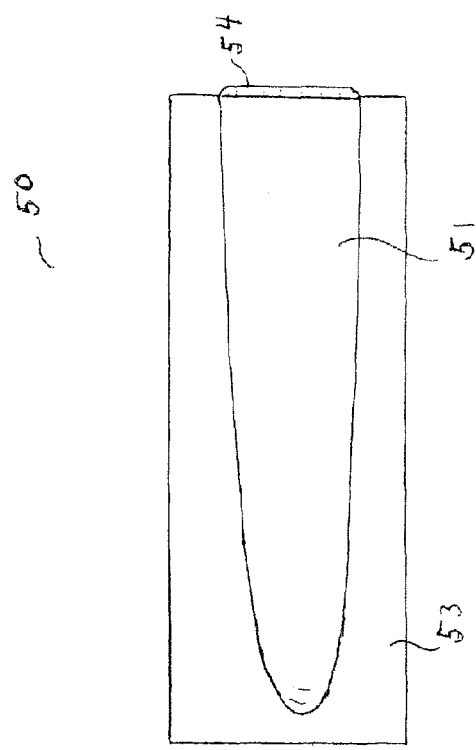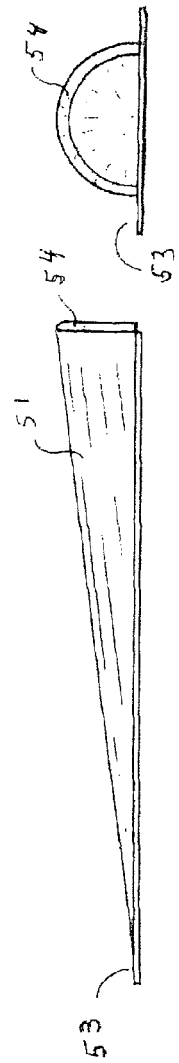
FIGURE 13
FIGURE 14
FIGURE 15

PROTECTIVE COVERING FOR ROOF DEVICE

RELATED APPLICATIONS

This application is a continuation-in-part of my application Ser. No. 12/661,379, filed Mar. 16, 2010, and Applicant claims priority in part pursuant to 35 U.S.C. §120. Application Ser. No. 12/661,379 is based upon Provisional Application Ser. No. 61/210,639, filed Mar. 21, 2009, and which application Ser. No. 12/661,379 claimed priority and benefit therefrom under 35 U.S.C. §119(e). These applications are incorporated by reference herein.

FIELD OF THE INVENTION

This application relates to protective covers for roof mounted systems which help prevent water entry.

BACKGROUND OF THE INVENTION

This invention broadly relates to residential roof mounted systems and, more particularly relates to a protective covering for helping to prevent water entry to structure-underlying roof locations at which the particular roof systems are fastened.

Various roof mounted systems are known. Examples without limitation include roof-mounted satellite antenna systems, roof-mounted solar water-heating systems, roof-mounted air cooling systems and roof-mounted solar panel systems, for example, photovoltaic mounting systems, sometimes referred to as photovoltaic (PV) racking systems. It is also known that building codes require securing PV racking systems securely to a pitched roof's underlying structural members, further requiring that multiple lag screws or through bolts penetrate the roofing material and sheathing in order to secure the PV racking system. Each associated hole is a potential entry point for water into the underlying structure for the entire life of the mounted PV racking system.

One common way of for securing roof-mounted apparatus', such as PV racking systems, to a roof is to mount the bracket to the roof at one end, by using a fastener such as an exposed lag screw or bolt, and attaching the bracket at its other end, or by attaching to an attaching point to the PV racking system. Brackets come in many shapes and sizes, for example, in a form of an L-bracket. While mounting a roof system with a bracket, such as an L-bracket, will generally include sealing the area around the exposed lag screw with a sealant such as waterproof caulking, such seals do not readily last for the life of the roof mounted system, and once installed and attached at the bracket, the roof mounted system will normally prevent access to reseal the mounting hole.

SUMMARY OF THE INVENTION

The present invention was developed to overcome the sealing difficulties of prior art roof mounting systems, such as, for example, solar panel installations, requiring roof fastener penetrations.

The invention comprises a novel protective cover over the roof for covering a fastener and part of an L-shaped bracket utilized on a roof, particularly a slanted roof, for securing a roof mounted system. The cover comprises a sheet of metal, or other malleable of molded material, formed as a triangular member, the narrow end of which may be inserted under a portion of a roofing shingle, and the rear end of which extends over the normally exposed fastener and part of an L-shaped bracket attaching the solar panel installation to the roof. The protective covering is a portion of flat, malleable waterproof material molded to form a cover preferably forming a triangular-shaped structure when viewed from the side. The triangular shaped structure includes a base and a hypotenuse where the line of the roof acts as a side which is covered by at least the hypotenuse, with the hypotenuse of the triangular structure meeting the roof at an angle. The triangular structure is adapted for insertion under a portion of a roof shingle, and extending back in a slight rise (downwardly with respect to the roof) to cover the exposed fastener and L-shaped bracket which the fastener fastens to the roof. An alternative embodiment of the cover may include tabs at all end portions.

Protective covers of this invention in further alternate embodiments are formed with a variety of tapered covering member shapes besides flat, including curved non-sloping or sloping rounded tapered structures as well as peaked tapered structures.

The covers are installed and attached to brackets which are covered but for the part fastened to a rack frame for a solar panel installation.

Alternatively the covers may be installed, without any roof mounting system.

The cover covers the exposed L-bracket affixed to a portion of a roof via an exposed fastener. The cover may be maintained in place by sliding up under portions of the roofing shingles, and/or with an adhesive or sealant, e.g., silicone caulking. The cover should operate to help to prevent water seepage into the fastener opening as long as it remains fixed in place, regardless of the longevity of the sealant/adhesive.

BRIEF DESCRIPTION OF THE DRAWINGS

The present invention can best be understood in connection with the accompanying drawings. It is noted that the invention is not limited to the precise embodiments shown in drawings, in which:

FIG. 6 is a top view of an alternate embodiment of cover of this invention with a full flashing flange on all three sides, including the front edge.

FIG. 7 is a side elevation of the alternate embodiment.

FIG. 8 is a front elevation of the alternate embodiment.

FIG. 10 is a side elevation of the embodiment of FIG. 9.

FIG. 11 is a top plan view of the embodiment of FIG. 9.

FIG. 13 is a top plan view of another alternate embodiment cover with a sloping side and a rounded contour.

FIG. 14 is a side elevation showing the sloping configuration of the embodiment of FIG. 13.

FIG. 15 is an open end view showing the interior of the embodiment shown in FIG. 13.

DETAILED DESCRIPTION OF THE DRAWINGS

Figure 1:
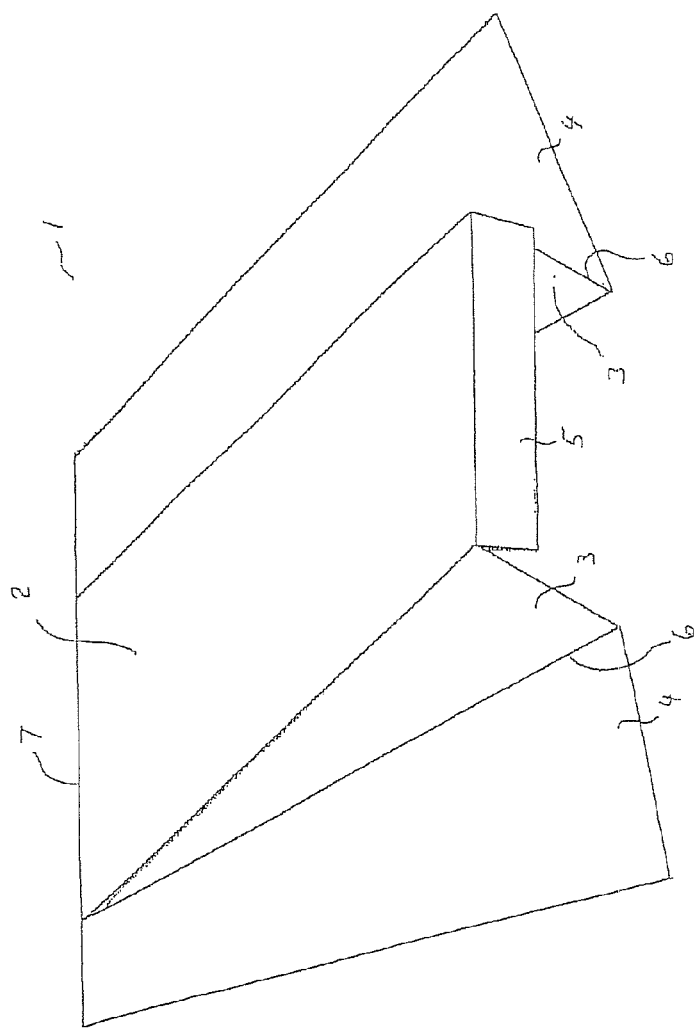
FIG. 1 is a perspective view of the cover of this invention.

FIG. 1 shows a protective cover 1 of this invention. Although many material choices and fabrication techniques are possible such as a variety of molded plastic materials, sheet metal (such as aluminum or copper) cut and folded or punch pressed into shape are preferred. Sloped surface 2 is supported by triangular sides 3. Flanges 4 on each side are designed to be fitted underneath the top and side portions of a shingle, which is cut to fit the contour of surface 2. Optional back edge 5 forms a drip edge and further shields the roof fastener. Edges 6 at the intersection of sides 3 and flanges 4 as well as the front edge 7 are preferably sealed against the shingle with appropriate sealant.

Figure 2:
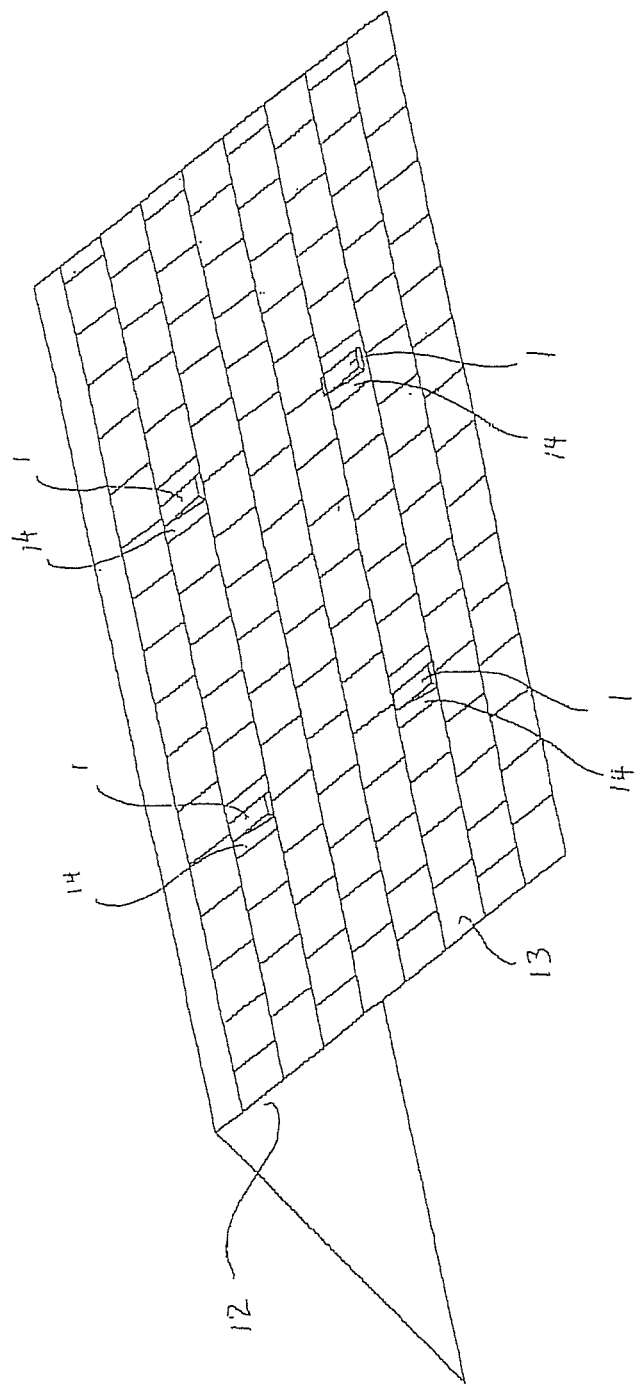
FIG. 2 is a perspective view of a pitched shingled roof with four of the covers of FIG. 1 spaced apart and installed over brackets for attachment to a solar collector.

FIG. 2 shows the placement of four covers 1 over mounting brackets for a solar collector on pitched roof 12. Note that the top layer of shingles 13 are cut around each cover 1 at the mounting sites 14.

Figure 3:
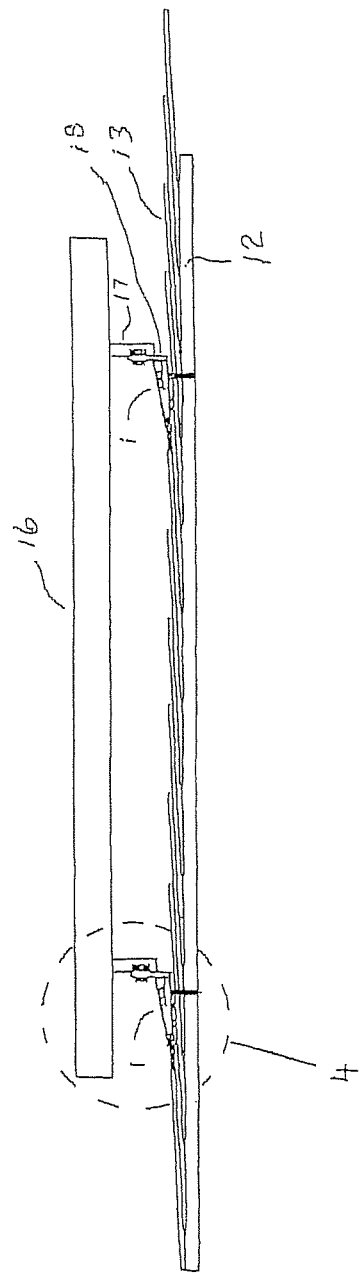
FIG. 3 is a side view showing the covers of FIG. 1 installed on a shingled roof as part of the attachment hardware of a solar collector.

FIG. 3 shows a side view of solar panel 16 mounted on roof 12 over shingles 13.

Figure 4:
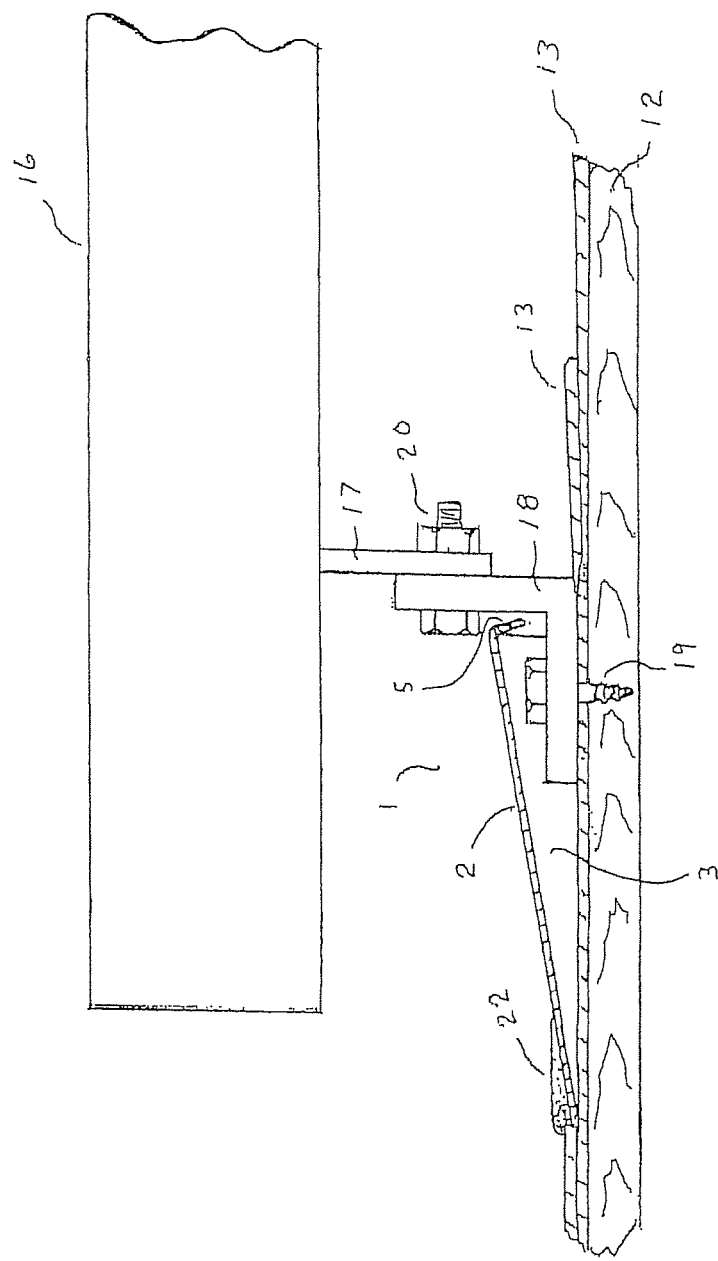
FIG. 4 is an enlarged side view detail of the cover of FIG. 1 (shown in crossection) protecting the bracket fastener installation of a solar collector.

The fastener area is enlarged in the detail shown in FIG. 4. L-bracket 18 is attached by lag bolt 19 to roof 12. Collector mounting bar 17 is attached via fastener 20 to bracket 18. Cover 1 (shown in crossection) covers the head of normally exposed fastener 19 which is now covered under sloped section 2. A small portion of sealant 22 is seen at the front end of cover 1.

Figure 5:
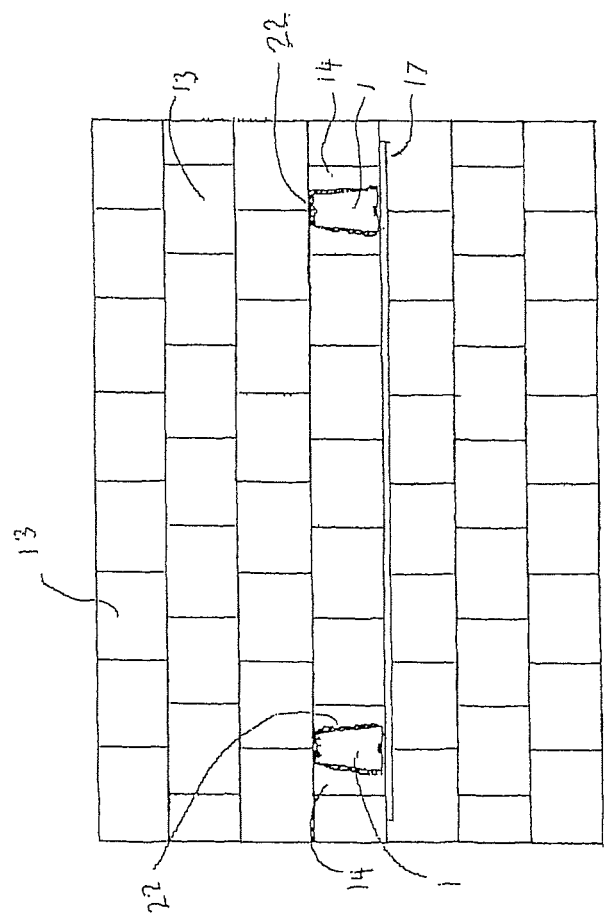
FIG. 5 is a detail top view of two covers installed on a shingled roof showing the use of sealant on three sides. (The solar collector is not shown in this view for clarity, although the fastening strip of the collector is shown.).

FIG. 5 shows a section of roof with two covers 1 installed inside the cut-away contour of top shingles 14 and sealed with a bead of sealant 22 on the front edge and both sides.

FIGS. 6-8 show a top side and front view respectively of an alternate embodiment of cover 30 of this invention. This cover has a continuous flashing flange 33 that surrounds the sloping area 32 on all three sides including the front. Optional back drip edge 34 serves the same function as edge 5 of cover 1. Contour 36, which is located at the interface of front of section 32 and sides 35 with flange 33; defines the location of sealant bead that would be applied to seal cover 30 with shingled surfaces.

FIGS. 9-20 show several embodiments of covers of this invention with alternative shapes besides the flat sloping cover of the embodiments above. An optional rear drip edge can be appended to the rear of any of these embodiments.

Figure 9:
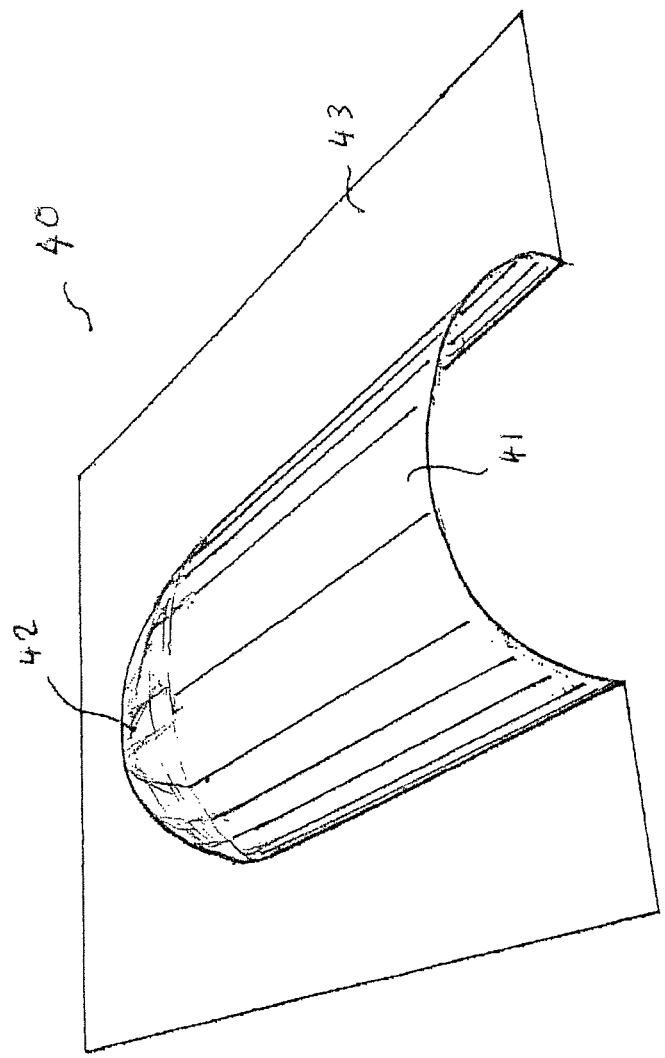
FIG. 9 is a perspective view of an alternate embodiment cover with a domed front and an axially truncated rounded cylinder.
Figure 12:
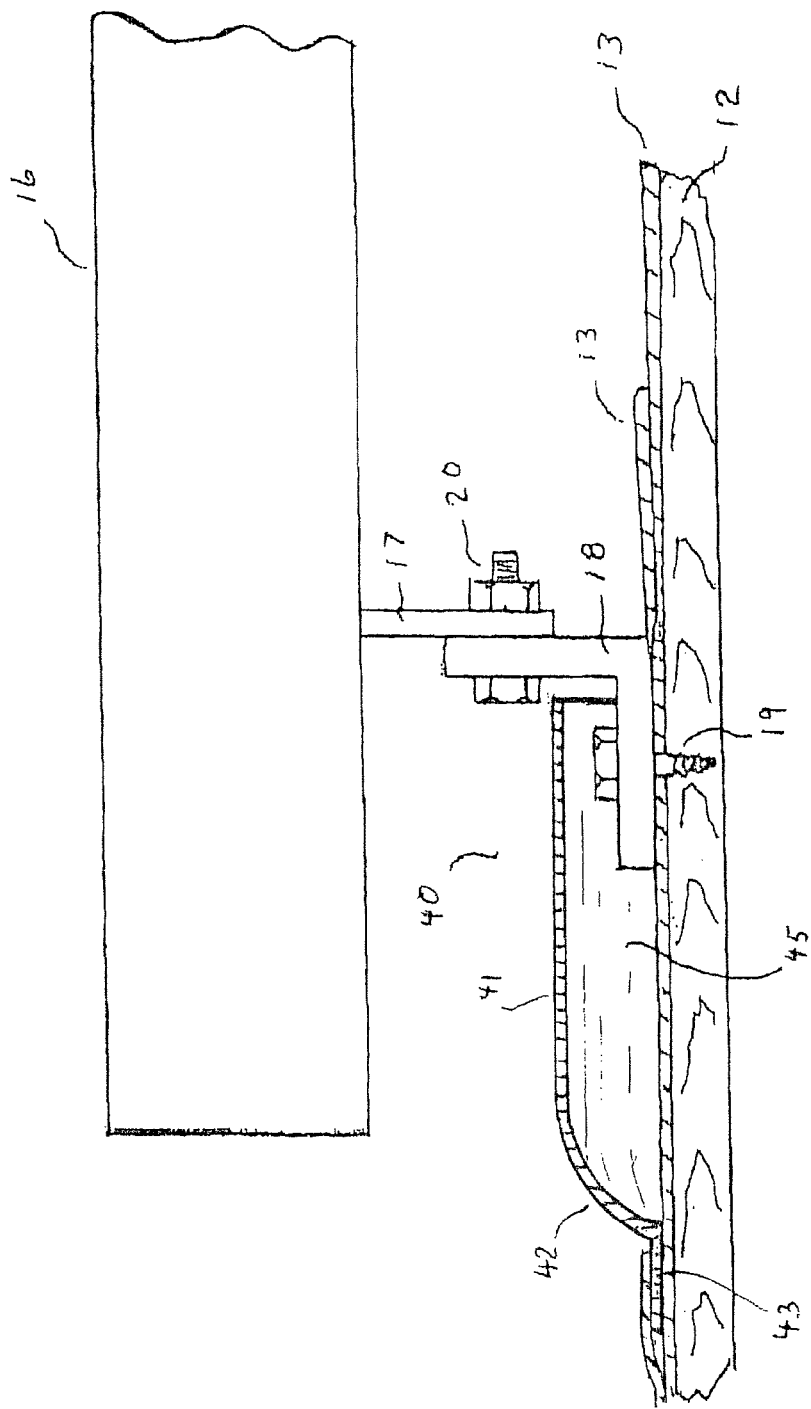
FIG. 12 is a side view detail of the cover of FIG. 9 (shown in crossection) protecting the bracket fastener installation of a solar collector.

The embodiment 40 of FIGS. 9-12 is best understood in geometric terms as a curved hollow cylinder of circular or oval crossection tapered with a domed front as truncated by a plane parallel to the cylinder axis. FIG. 9 shows a perspective view while FIGS. 10 and 11 show a side elevation and a top view respectively. A flange 43 is shown around three edges of the cover. Dome closed end 42 and cylindrical cover 41 complete the embodiment. FIG. 12 shows a detail of an installation with cover 40 shown in crossection. The interior 45 is shown in a side view.

Figure 16:
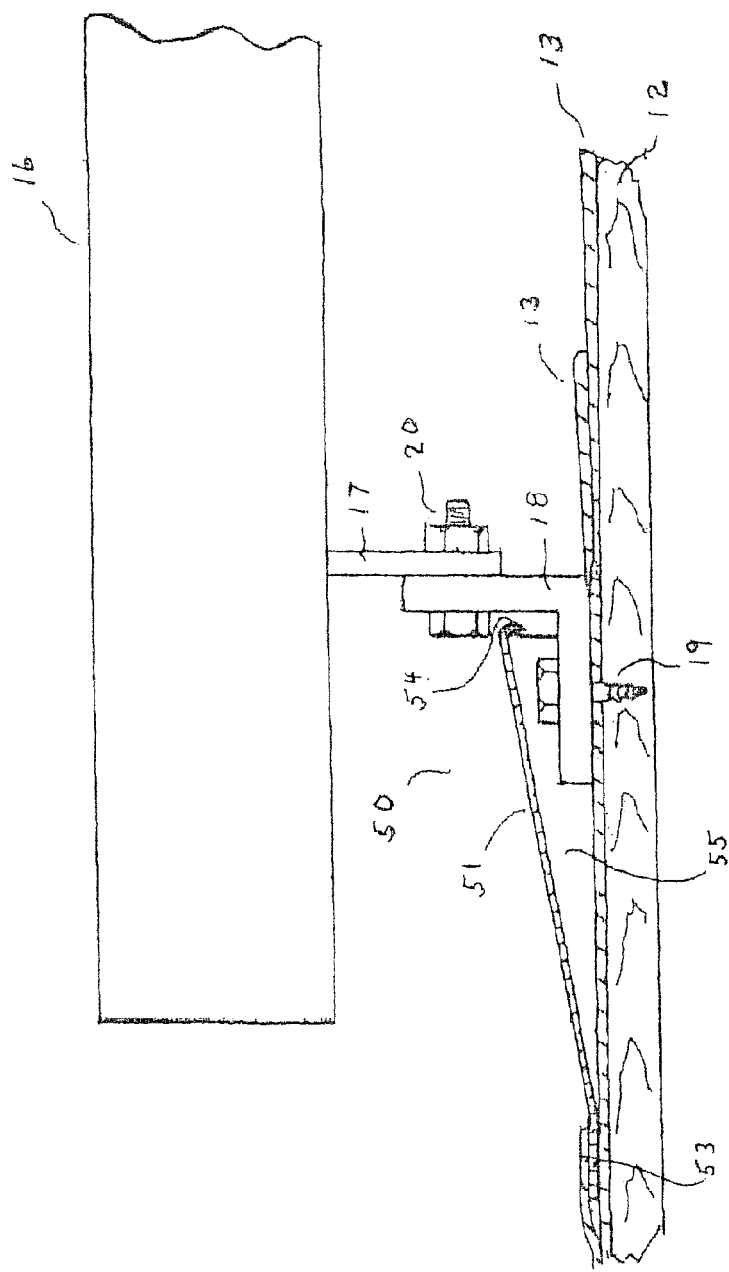
FIG. 16 is a side view detail of the cover of FIG. 13 (shown in crossection) protecting the bracket fastener installation of a solar collector.
Figure 18:
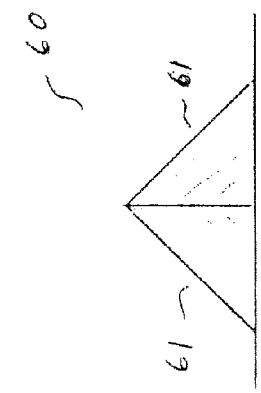
FIG. 18 is an open end view of the cover shape of FIG. 17 showing the interior.
Figure 20:
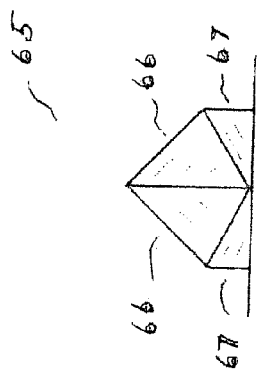
FIG. 20 is an open end view of the cover shape of FIG. 19 showing the interior.
Figure 17:
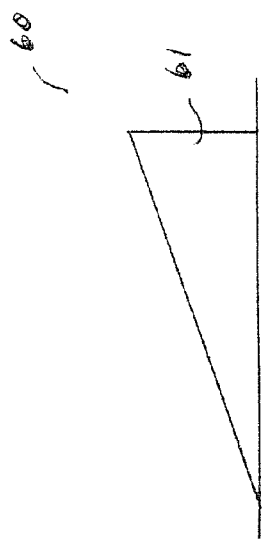
FIG. 17 is a side elevation of a cover shape of yet another embodiment of this invention with a peaked sloping shape formed of two triangles.
Figure 19:
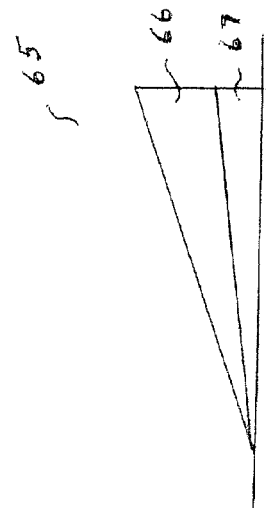
FIG. 19 is a side elevation of another sloping peaked cover shape embodiment, but with vertical sides.

FIGS. 13-16 show cover embodiment 50 in various views. The geometry here is best described as a curved hollow tapered cylinder of round or oval crossection as truncated by a plane angled to the axis and piercing the end at median and a side. The round contour 51 is shown surrounded at three edges by flange 53. An optional drip edge 54 is also shown at the rear. FIG. 16 shows the details of an installation with cover 50 shown in crossection. The sloping contoured interior 55 is shown in this view.

Other cover shape embodiments with sloping peaked shapes are shown in FIGS. 17-20. Shape 60 (FIGS. 17-18) has two triangular sides 61 joined at a central peak. Shape 65 is similar to 60 having a central peak and sloping tapered down toward the front, however it has vertical sides 67 below sloping triangular roof members 66 joined at the peak. Other variations such as a gambrel roof with a symmetrical two-sided shape having two slopes on each side. The upper slope is positioned at a shallow angle, while the lower slope is steep. An arched roof with straight vertical sides is also possible.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

I claim:

1. A protective covering for, and in combination with, a roof-mounted system that is attached with a mounting bracket attached to a sloping roof using fasteners, comprising:
   a fastening member penetrating a shingle and underlining structure of said roof for attaching said mounting bracket to said roof;
   said roof-mounted system supported and spaced from said roof by a mounting member connected to said mounting bracket and said roof-mounted system;
   a portion of at least one shingle being cut away to accommodate said mounting bracket mounted on said roof;
   a protective cover for enclosing said fastening member and at least a portion of said mounting bracket for preventing fastening leaks of water through said roof;
   said protective cover comprising malleable waterproof material molded to form a curved top surface extending from a flashing flange base of said protective cover to a distal end of said protective cover and having curved side walls, said curved top surface having an open end forming an open archway having a curved vertical edge extending from said flashing flange base and spanning over said open end, said curved top surface extending lengthwise in a horizontal axis away from said open archway and converging to an opposite curved tapered end;
   said flashing flange base of said protective cover extending under a distal end of another shingle, said curved top surface extending out from said flashing flange base in a slight rise, downwardly with respect to the roof to form said curved side walls, said distal end of said protective cover covering the fastener and said portion of said mounting bracket.

2. The combination of claim 1 in which said mounting bracket is L-shaped, with said fastener extending through one leg of said mounting bracket into an underlying roof structure of said roof.

3. The combination of claim 2 in which said roof mounted system comprises a photovoltaic PV racking system.

4. The combination of claim 2 in which said curved top surface has front, rear, and side edges, said curved top surface being a half cone converging to a pair of tapered side walls extending down from an axial apex from the rear edge of said curved top surface with an apex of each side wall at said rear edge of said curved top surface, and said flashing flange base having a pair of flanges extending out from bottom edges of said tapered side walls;

the rear edge of said curved top surface resting on a top surface of said shingle adjacent an edge of a second, uphill shingle overlapping a rear, upper portion of said shingle whereby said curved top surface slopes downwardly and away from an upper surface of said shingle;

said curved top surface of said protective cover extending over a first leg of said mounting bracket covering said fastener and preventing water seepage on and about said fastener; and a mounting bar attached to and extending out from a second leg of said mounting bracket past a leading edge of said curved top surface for supporting a solar panel.

5. The combination of claim 1 in which said protected cover has a flap extending down from a distal edge of said protective cover forming a drip edge for providing further shielding of said fastener.

6. The combination of claim 1 in which said curved top surface comprises front, rear, and side edges, said curved top surface extending lengthwise in a horizontal axis away from said open archway of said protective cover forming a curved hollow half cylinder of circular or oval crossection, said opposite curved tapered end of said curved hollow half cylinder tapered with a closed domed portion opposite to said open archway of said protective cover, said closed domed portion being truncated by a plane parallel to the cylinder axis and a pair of flanges extending out from bottom edges of said curved hollow half cylinder.

7. The combination of claim 1 in which said curved top surface comprises front, rear, and side edges, said curved top surface of said protective cover forming a curved hollow tapered half cone of decreasing round crossection to a converging opposite curved end, as truncated by a plane angled to the horizontal axis and piercing the open end at a median.

8. The combination of claim 1 having sealant on a distal end of said shingle.

9. The combination of claim 1 in which multiple mounting brackets are mounted on more than one shingle to support said roof-mounted system.

10. The combination of claim 1 in which said fastener is a lag bolt.

11. The combination of claim 1 in which said protective cover is of one piece construction.

12. The combination of claim 1 in which said roof-mounted system comprising a solar panel.

* * * * *